(12) United States Patent
Beller et al.

(10) Patent No.: US 11,531,708 B2
(45) Date of Patent: Dec. 20, 2022

(54) SYSTEM AND METHOD FOR QUESTION ANSWERING WITH DERIVED GLOSSARY CLUSTERS

(71) Applicant: International Business Machines Corporation, Armonk, NY (US)

(72) Inventors: Charles E. Beller, Baltimore, MD (US); Edward Graham Katz, Washington, DC (US); John A Riendeau, Madison, WI (US); Sean Thomas Thatcher, Stone Ridge, VA (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 16/896,856

(22) Filed: Jun. 9, 2020

(65) Prior Publication Data

US 2021/0382946 A1    Dec. 9, 2021

(51) Int. Cl.
*G06F 16/00*        (2019.01)
*G06F 16/9032*      (2019.01)
(Continued)

(52) U.S. Cl.
CPC .... *G06F 16/90332* (2019.01); *G06F 16/2462* (2019.01); *G06F 16/24578* (2019.01);
(Continued)

(58) Field of Classification Search
CPC ........... G06F 16/24578; G06F 16/2462; G06F 16/3347; G06F 16/901; G06F 16/90332;
(Continued)

(56) References Cited

U.S. PATENT DOCUMENTS

| 8,589,791 B2 | 11/2013 | Caldwell et al. |
| 9,043,265 B2 | 5/2015 | Michelin |

(Continued)

FOREIGN PATENT DOCUMENTS

| WO | WO2009143395 A1 | 11/2009 |
| WO | 201535932 A1 | 3/2015 |

OTHER PUBLICATIONS

Jannink, Jan Frederic. "Semantic Interoperation for Heterogeneous Information Sources: First Steps." PhD diss., Stanford university, 2000. (Year: 2000).*

(Continued)

*Primary Examiner* — Diedra McQuitery
(74) *Attorney, Agent, or Firm* — Edward P. Li

(57) ABSTRACT

A method, system, and computer-usable medium are disclosed for answering general background questions on a topic from documents with glossary sections, A set of documents with glossaries is received from which a set of terms and associated glossary entries are extracted, where each term has a corresponding glossary entry. Association is performed of related glossary entries. The associations is based on a similarity algorithm to form glossary clusters where each glossary cluster refers to one or more glossary entries. A query with query terms tailored to general information is received. The glossary clusters are ranked relevance to the query terms to form a ranked set. A set of glossary clusters meeting a high ranked threshold is selected and provided.

20 Claims, 6 Drawing Sheets

(51) Int. Cl.
*G06F 16/906* (2019.01)
*G06F 16/9038* (2019.01)
*G06K 9/62* (2022.01)
*G06F 16/2458* (2019.01)
*G06F 16/2457* (2019.01)
*G06F 16/33* (2019.01)
*G06F 16/901* (2019.01)
*G06F 40/205* (2020.01)
*G06F 17/18* (2006.01)

(52) U.S. Cl.
CPC ........ *G06F 16/906* (2019.01); *G06F 16/9038* (2019.01); *G06K 9/6219* (2013.01); *G06F 16/3347* (2019.01); *G06F 16/901* (2019.01); *G06F 17/18* (2013.01); *G06F 40/205* (2020.01)

(58) Field of Classification Search
CPC .... G06F 16/9038; G06F 16/906; G06F 17/18; G06F 40/205; G06K 9/6219
See application file for complete search history.

(56) References Cited

U.S. PATENT DOCUMENTS

| | | | |
|---|---|---|---|
| 9,081,785 | B2 | 7/2015 | Mandelstein et al. |
| 9,275,062 | B2 | 3/2016 | Janssen et al. |
| 9,530,228 | B1 | 12/2016 | Fermum et al. |
| 9,665,568 | B2 | 5/2017 | Gerard et al. |
| 10,013,641 | B2 | 7/2018 | Helfman et al. |
| 10,169,423 | B2 | 1/2019 | Bhatia et al. |
| 10,170,014 | B2 | 1/2019 | Beason et al. |
| 10,402,491 | B2 | 9/2019 | Hosabettu |
| 2006/0026204 | A1* | 2/2006 | Campbell ............... G06F 16/36 |
| 2007/0282780 | A1* | 12/2007 | Regier .................. G06F 16/951 707/E17.108 |
| 2011/0137921 | A1* | 6/2011 | Inagaki ............... G06F 16/3347 707/E17.061 |
| 2013/0086076 | A1 | 4/2013 | Pandit et al. |
| 2013/0260358 | A1 | 10/2013 | Lorge |
| 2015/0088910 | A1* | 3/2015 | Misra .................... G06F 40/131 707/749 |
| 2016/0103885 | A1 | 4/2016 | Lee et al. |
| 2016/0132486 | A1 | 5/2016 | Hauser et al. |
| 2016/0203498 | A1 | 7/2016 | Das |
| 2016/0292149 | A1* | 10/2016 | Mote ....................... G06F 40/30 |
| 2017/0004208 | A1 | 1/2017 | Podder |
| 2017/0075877 | A1* | 3/2017 | Lepeltier ............... G06F 40/117 |
| 2017/0169359 | A1 | 6/2017 | Chernis et al. |
| 2018/0025061 | A1 | 1/2018 | Dantressangle et al. |
| 2018/0107654 | A1* | 4/2018 | Jung ..................... G06F 40/295 |
| 2018/0365323 | A1 | 12/2018 | Doornenbal |
| 2019/0179949 | A1 | 6/2019 | Gerstl et al. |
| 2020/0257761 | A1* | 8/2020 | Bull ....................... G06F 40/289 |
| 2021/0117509 | A1 | 4/2021 | Aditya |

OTHER PUBLICATIONS

Mchemi at al., "Rapid Induction of Multiple Taxonomies for Enhanced Faceted Text Browsing," International Journal of Artificial Intelligence and Applications (IJAIA), vol. 7, No. 4, Jul. 2016, 13 pages.

Hovy e al., "Extending Metadata Definitions by Automatically Extracting and Organizing Glossary," Proceedings of the 2003 Annual National Conference on Digital Government Research, Jan. 2003, 6 pages.

Westerhout, Eline, "Definition Extraction using Linguistic and Structural Features," WDE '09: Proceedings of the 1st Workshop on Definition Extraction, Sep. 2009, 7 pages.

List of IBM Patents or Applications Treated as Related, 2020.

Chetan Arora et al., Automated Extraction and Clustering of Requirements Glossary Terms, IEEE Transactions aon Software Engineering, vol. 43, Issue: 10, Oct. 1, 2017, pp. 918-945.

Tim Gemkow et al., Automatic Glossary Term Extraction From Large-Scale Requirements Specifications, 26th IEEE International Requirements Engineering Conference, Aug. 20-24, 2018, Banff, Alberta, Canada.

Roberto Navigli et al., GlossExtractor: A Web Application to Automatically Create a Domain Glossary, Artificial Intelligence and Human-Oriented Computing, 10th Congress of the Italian Association for Artificial Intelligence, Rome, Italy, Sep. 10-13, 2007, 11 pages.

Paola Velardi et al., Mining the Web to Create specialized Glossaries, IEEE Intelligent Systems, vol. 23, No. 5, Sep./Oct. 2008, 18 pages.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages. Dec. 12, 2012.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

SYSTEM AND METHOD FOR QUESTION ANSWERING WITH DERIVED GLOSSARY CLUSTERS

BACKGROUND OF THE INVENTION

Field of the Invention

The present invention relates in general to the field of computers and similar technologies, and in particular to software utilized in this field. Still more particularly, it relates to a method, system and computer-usable medium for answering questions on a topic from documents with glossary sections.

Description of the Related Art

With the increased usage of computing networks, such as the Internet, users rely on search engines and searching technology to find relevant results to their queries or questions. For example, deep question and answering systems may be implemented with information retrieval or search technology and provide a natural language interface. Such systems can be used to find and provide fact or factoid based answers to questions within a corpus of unstructured text.

Typically, to achieve acceptable answers, such deep question and answering systems may require users to have some level of background knowledge about a subject in order to compose useful questions. For example, a user may need to know some basic facts about Winter Olympic events in order to ask who won the Bobsled competition in the 1988 Winter Olympics. If a user does not have such background information to compose useful questions, a useful implementation would be to allow the user to ask general questions and receive pointers to domain terms that can help the user formulate questions suitable for deep question and answering systems. For example, a user can ask "what is associated with sledding sports?" and receive pointers to event terminology for events such as "bobsled," "luge," "skeleton," etc.

SUMMARY OF THE INVENTION

A method, system, and computer-usable medium are disclosed for answering general background questions on a topic from documents with glossary sections, A set of documents with glossaries is received from which a set of terms and associated glossary entries are extracted, where each term has a corresponding glossary entry. Association is performed of related glossary entries. The associations is based on a similarity algorithm to form glossary clusters where each glossary cluster refers to one or more glossary entries. A query with query terms tailored to general information is received. The glossary clusters are ranked relevance to the query terms to form a ranked set. A set of glossary clusters meeting a high ranked threshold is selected and provided.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
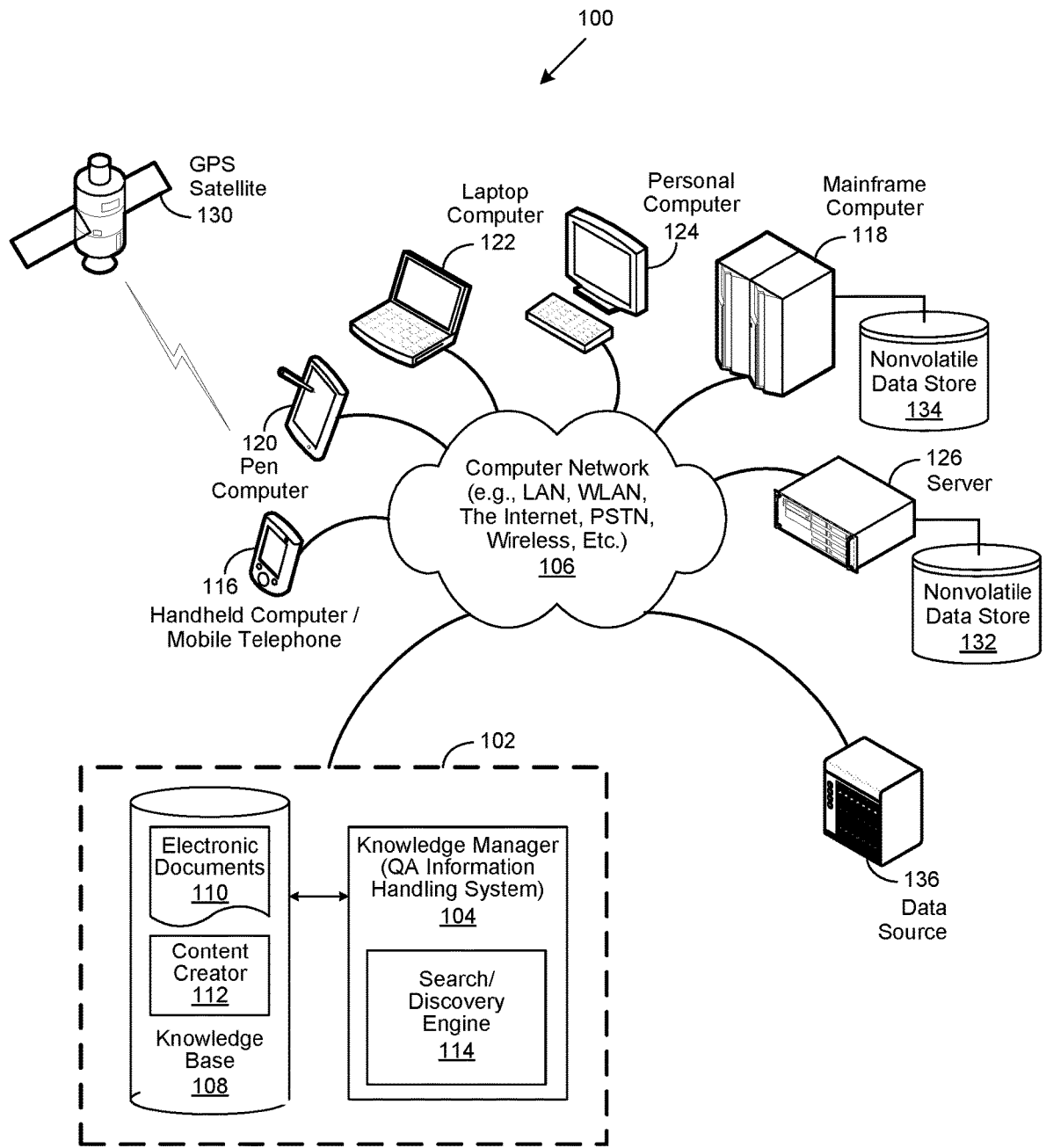
FIG. 1 depicts a computer network environment that includes a knowledge management system.

The present application relates generally to answering general background questions on a topic from documents with glossary sections. FIG. 1 depicts a schematic diagram of one illustrative embodiment of a computer network environment that supports the systems and methods described herein. In particular, the computer network environment 100 provides for a knowledge management system 102 which is instantiated in computer network environment 100. An example of question/answer generation which may be used in conjunction with the principles described herein is described in U.S. Patent Application Publication No. 2011/0125734, which is herein incorporated by reference in its entirety.

The knowledge management system 102 may include a knowledge manager (question and answering information handling system) computing device 104 that includes one or more processors and one or more memories, and potentially any other computing device elements generally known in the art including buses, storage devices, communication interfaces, and the like) connected to a network 106. The network 106 may include multiple computing devices in communication with each other and with other devices or components via one or more wired and/or wireless data communication links, where each communication link may comprise one or more of wires, routers, switches, transmitters, receivers, or the like.

The knowledge management system 102 and the computer network environment 100 may enable question and answer (QA) generation functionality for one or more content users. Other embodiments of knowledge management system 102 may be used with components, systems, subsystems, and/or devices other than those that are depicted herein.

Knowledge manager computing device 104 may be configured to receive inputs from various sources. For example, knowledge manager computing device 104 may receive input from the network 106, a knowledge base 108 which can include a corpus of electronic documents 110 or other data, a content creator 112, content users, and other possible sources of input. In various embodiments, the other possible sources of input can include location information. In one embodiment, some or all of the inputs to knowledge manager computing device 104 may be routed through the network 106. The various computing devices on the network 106 may include access points for content creators and content users. Some of the computing devices may include devices for a database storing the corpus of data. The network 106 may include local network connections and remote connections in various embodiments, such that the knowledge management system 102 may operate in environments of any size, including local and global, e.g., the Internet. Additionally, knowledge manager computing device 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator 112 creates content in electronic documents 110 for use as part of a corpus of data with knowledge manager computing device 104. The electronic documents 108 may include any file, text, article, or source of data for use in knowledge management system 102. Content users may access knowledge management system 102 via a network connection or an Internet connection (represented as to the network 106) and may input questions to knowledge management system 102 that may be answered by the content in the corpus of data. As further described below, when a process can implement a query with exclusion criteria from the knowledge manager. Certain embodiments provide for Natural Language Processing (NLP), such that knowledge management system 102 can be considered as an NLP system, which in certain implementations performs the methods described herein. In one embodiment, the process sends queries in the form of natural language questions, etc.) to the knowledge manager computing device 104. Knowledge manager computing device 104 may interpret questions/queries and provide a response to the content user containing one or more answers/results to the questions/queries. In some embodiments, knowledge manager computing device 104 may provide a response to users in a ranked list of answers. Certain embodiments provide for knowledge manager computing device 104 to include a search/discovery engine 114.

One such knowledge management system 102 is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

In some illustrative embodiments, knowledge manager computing device 104 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. There may be hundreds, or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize computer network environment 100 range from small handheld devices, such as handheld computer/mobile telephone 116 to large mainframe systems, such as mainframe computer 118. Examples of handheld computer 116 include personal digital assistants (PDAs), personal entertainment devices, such as MP3 players, portable televisions, and compact disc players. Other examples of information handling systems include pen, or tablet, computer 120, laptop, or notebook, computer 122, personal computer system 124, and server 126. In certain embodiments, the location information is determined through the use of a Geographical Positioning System (GPS) satellite 130. In these embodiments, a handheld computer or mobile telephone 116, or other device, uses signals transmitted by the GPS satellite 130 to generate location information, which in turn is provided via the network 106 to the knowledge manager system 102 for processing. As shown, the various information handling systems can be networked together using network 106. Types of network 106 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 126 utilizes nonvolatile data store 132, and mainframe computer 118 utilizes nonvolatile data store 134). The nonvolatile data store 134 can be a component that is external to the various information handling systems or can be internal to one of the information handling systems. Furthermore, a data source 136 is provided in computer network environment 100.

Figure 2:
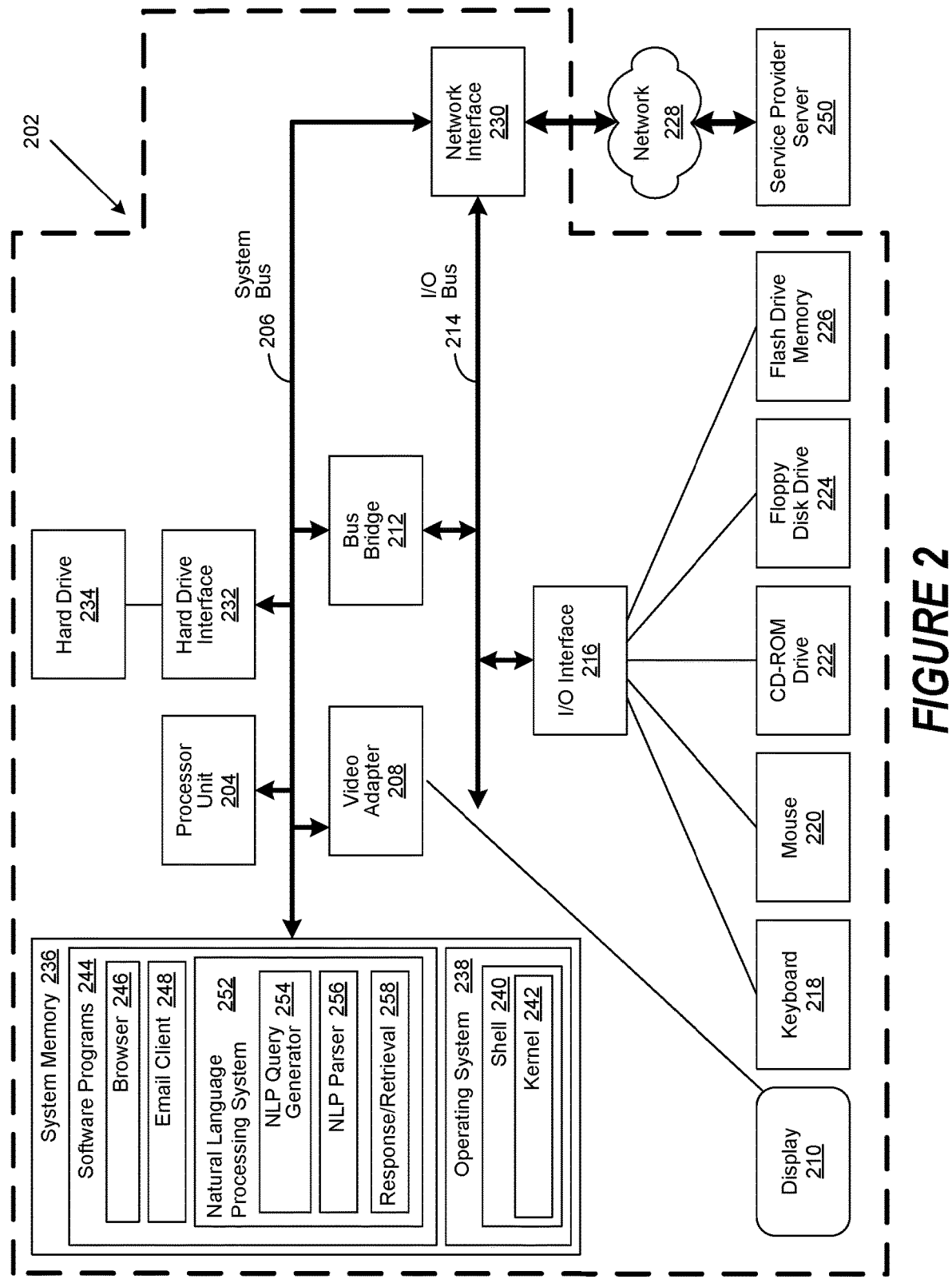
FIG. 2 is a simplified block diagram of an information handling system capable of performing computing operations described herein.

An illustrative example of an information handling system showing an exemplary processor and various components commonly accessed by the processor is shown in FIG. 2. FIG. 2 illustrates an information processing handling system 202, more particularly, a processor and common components, which is a simplified example of a computer system capable of performing the computing operations described herein. Information processing handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing information handling system 202 is able to communicate with a service provider server 250 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 250.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing information handling system 202) to send and receive network messages to the Internet using Hyper Text Transfer Protocol (HTTP) messaging, thus enabling communication with service provider server 250.

In various embodiments, software programs 244 includes a natural language processing (NLP) system 252. In various implementations, the NLP system 252 includes a document ingest module 254, a query generator module 256, and an indexing module 258. As further described herein, documents with glossary sections are processed or ingested by the document ingest module 254, user queries are processed by the query generator module 256, and topic clusters are indexed by the indexing module 258.

The hardware elements depicted in the information processing information handling system 202 are not intended to be exhaustive, but rather are representative to highlight components used by the present invention. For instance, the information processing information handling system 202 may include alternate memory storage devices such as magnetic cassettes, Digital Versatile Disks (DVDs), Universal Serial Bus (USB) drives, Secure Digital (SD) cards, Solid State Drive (SSD), and the like. These and other variations are intended to be within the spirit, scope and intent of the present invention.

Figure 3:
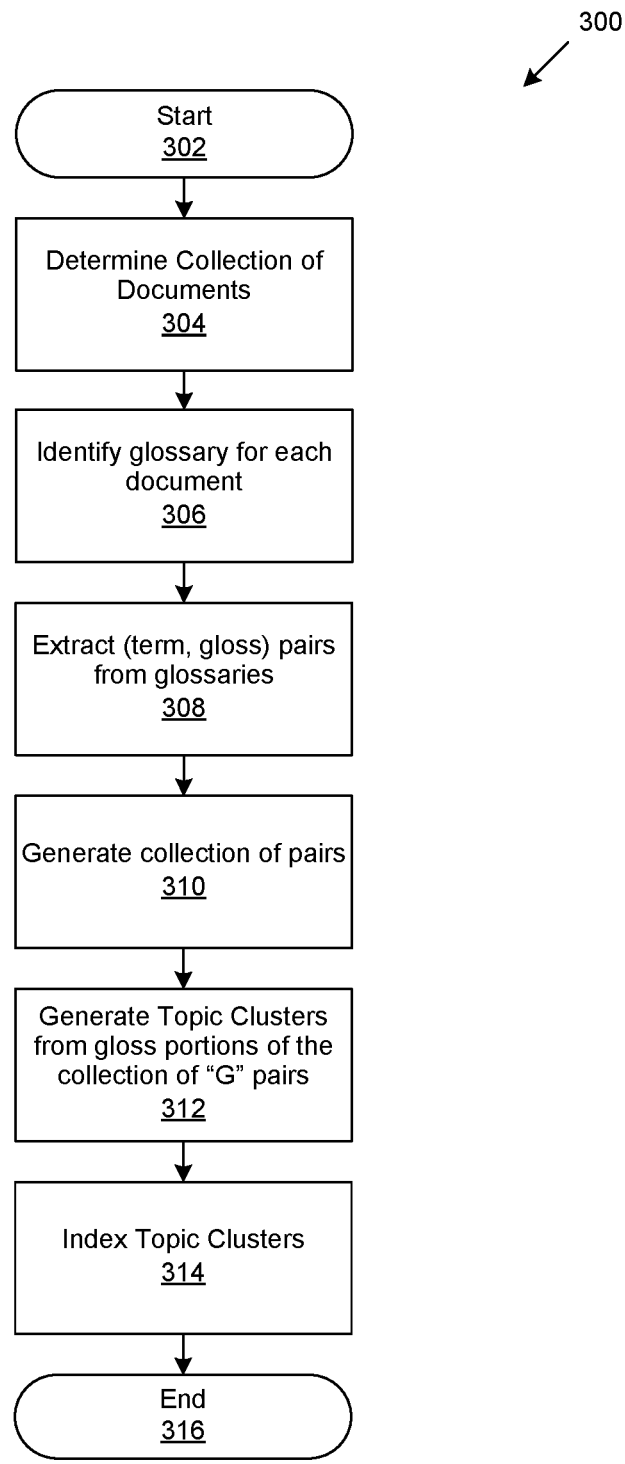
FIG. 3 is a generalized flowchart for ingestion of documents with glossaries.

FIG. 3 is a generalized flowchart 300 for ingestion of documents with glossaries. In various implementations, the document ingest module 254 performs the process 300. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 starts. At step 304, determination is performed as to a collection or corpus of documents that include glossary sections. A glossary provides definitions or "glosses" of specific terms. Using the example of Winter Olympic sporting events, the following is a sample glossary of terms and their definitions or glosses (as italicized):

luge
   *a racing sled for one or two people*
   *a sport in which competitors make a timed descent of a course riding a luge*
hockey
   *a game played on an ice rink by two opposing teams of six skaters each who try to knock a flat round puck into the opponents' goal with angled hockey sticks*
skeleton
   *a small sled for one person, ridden headfirst while lying in a prone position a sport in which a competitor races down frozen track on a skeleton sled.*
figure skating
   *the competitive sport of ice skating in prescribed patterns (figures) and choreographed free skating*
biathlon
   *a Nordic skiing event in which the competitors combine cross-country skiing and rifle shooting*
bobsled
   *a mechanically steered and braked sled, typically manned by crews of two or four, used for racing down a steep ice-covered run with banked curves* ski jump
   a steep slope leveling off before a drop to a lower slope, used in Nordic skiing to perform jumps
curling
   a game played on ice, especially in Scotland and Canada, in which large round flat stones are slid across the surface toward a mark. Members of a team use brooms to sweep the surface of the ice in the path of the stone to control its speed and direction
slalom
   a ski race down a winding course marked by flags or poles
snowboarding
   the sport or pastime of sliding downhill on a snowboard Certain implementations provide for the collection or corpus of documents to be retrieved from various sources, such as sources described in FIG. 1, that include knowledge base 108 and electronic documents 110, nonvolatile data stores 132 and 134, and data source 136.

At step 306, identifying the glossary of each document is performed. Each document includes a glossary section which is identified.

At step 308, extracting is performed of (term, gloss) pairs from each of the glossaries of the documents. For example, for the term "luge" in the sample glossary above, there can be two pairs: (luge, a racing sled for one or two people) and (luge, a sport in which competitors make a timed descent of a course riding a luge). In certain embodiments, extraction is performed for a single pair where the gloss section contains the text of both definitions. i.e. (luge, a racing sled for one or two people; a sport in which competitors make a timed descent of a course riding a luge).

At step 310, a collection is generated of the pairs extracted at step 308. The set of terms can be defined as "T" of the set $(T_1, T_2, \ldots, T_n)$ and associated glossary entries "G" of the set $(G_1, G_2, \ldots, G_n)$, where each term $T_i$ has an associated glossary entry $G_i$.

At step 312, topic clusters are generated from the gloss portions of the (term, gloss) pairs. The topic clusters can be based on a similarity algorithm, and in particular generated using various clustering algorithms, such as standard text clustering approaches, for example, converting the glosses or glossary entries into vector representations, calculating pairwise cosine distances, using an agglomerative clustering algorithm to generate a dendrogram, and identifying a threshold to split the dendrogram into clusters. Running a clustering algorithm on a collection of glossaries results in an interesting data artifact. Although the glossary entries have some type information, the clusters may not be useful for tasks such as taxonomy augmentation since the clusters do not respect type restrictions. Because the clusters are topic specific, they provide a means to answer questions that do not incorporate type restrictions, such general background information questions. This is fundamentally different than answering factoid based questions.

At step 314, indexing is performed of the topic clusters. In various implementations, the indexing module 258 performs the indexing. The indexing is used for retrieval in the querying described herein. In certain embodiments, for each cluster, glossary entries are combined from that cluster into a single aggregate document. In other embodiments, each glossary definition can be treated as a document and indexed, and then a separate structure can be maintained that maps a glossary entry to the set of glossary entries from its enclosing cluster. At step 316, the process 300 ends.

Figure 4:
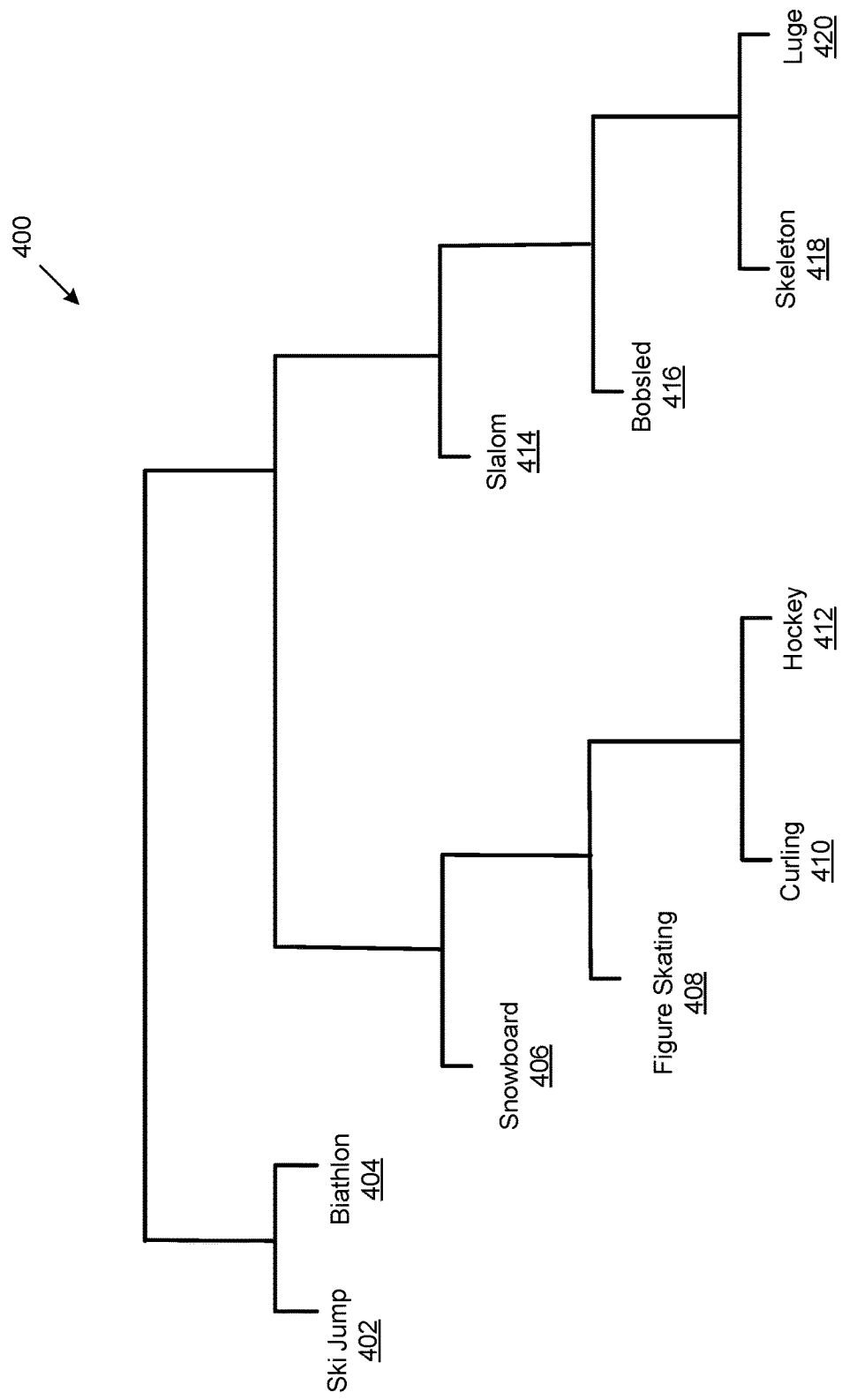
FIG. 4 depicts a clustering structure.

FIG. 4 is an example of a clustering structure. In particular, the clustering structure 400 or topic cluster is generated from the gloss portions of the (term, gloss) as described in step 312 of FIG. 3. The clustering structure 400 covers Winter Olympic sports events. The clustering is performed for events ski jump 402, biathlon 404, snowboard 406, figure skating 408, curling 410, hockey 412, slalom 414, bobsled 416, skeleton 418, and luge 420. The events are terms in the glossary, and their glosses are used to generate the clustering structure 400.

Figure 5:
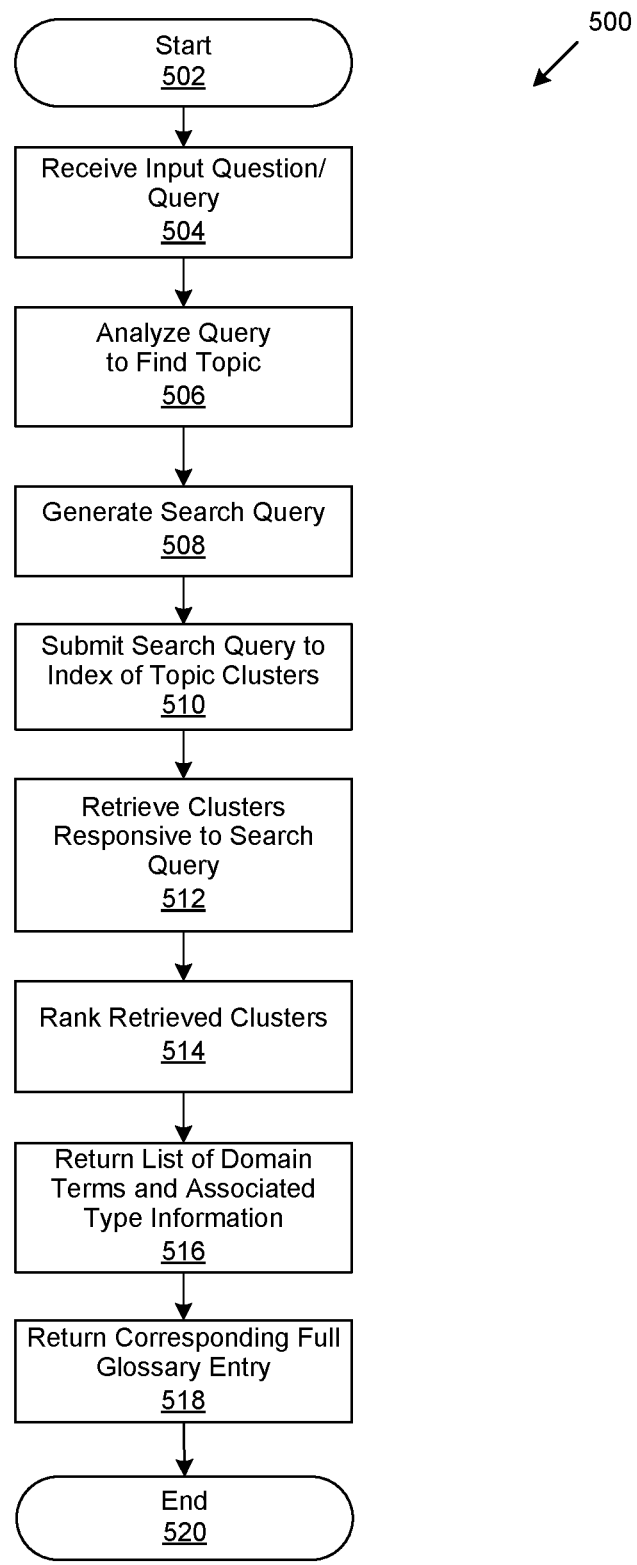
FIG. 5 is a generalized flowchart for querying or receiving and processing questions from a user.

FIG. 5 is a generalized flowchart 500 for querying or receiving and processing questions from a user. In various implementations, the query generator module 256 performs the process 500. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, a question or query is received. The query can be in the form of a general question, where pointers are provided in the answer that provide pointers to domain terms that can help to formulate questions suitable for question and answering system, such as knowledge management system 102 described in FIG. 1. An example query can be "What is associated with sledding sports?"

At step 506, the query or question is analyzed to find a topic. In various embodiments, the analysis differs from traditional factoid base question and answer processes in the sense that rather than analyzing for a lexical answer type, analyzing is performed for a lexical answer topic. A lexical answer topic differs from a lexical answer type in that the lexical answer topic does not constrain the type of answer, but instead signifies the content that the clusters should match. In various embodiments analyzing the query or question involves classifying the query or question as a background information question by matching terms such as "have to do with," "pertain to," or associated with."

At step 508, a search query is generated based on the analysis. For an example question such as "What pertains to timed descent," "pertains to" indicates a "background information" question, and a query can be formed from the content words "timed descent" in the argument position of "pertains to."

At step 510, the search query is submitted to the index of topic clusters as described in step 314 of FIG. 3. The search query is submitted to retrieve clusters that are responsive to the search query.

At step 512, retrieving of the clusters responsive to the search query is performed. Retrieving is performed either for aggregated documents or retrieving the best matching glossary entry and then following the associated pointers to the other glossary entries from that cluster.

At step 514, ranking is performed for the clusters that are retrieved, by relevance to the query. In certain implementations, the ranking is trivial and provided by relevance of the indexing module 258. For other implementations, there can be additional scoring provided by relevance indicators from modifiers of the question. For example, using the following question "What in the Olympics pertains to timed descent?," if there are multiple glossaries in a corpus, a modifier phrase like "in the Olympics" can improve the relevance of glossary clusters from Olympics related glossaries.

At step 516, a list of domain terms and associated type information is returned/provided for the top N clusters, where N is a predetermined number. For the following type of example question "What sporting events pertain to timed descent?" for certain embodiments, detection can be performed for both lexical answer topic and lexical answer type, and only type matching domain terms returned. Therefore, responsive to the example question, only "sporting event" type terms are returned or can be ranked higher.

At step 518, corresponding full glossary entry is returned, which can be responsive to indication of further interest in a glossary term. This can ensure that links are maintained from the terms in the glossary definitions for future consumption.

Figure 6:
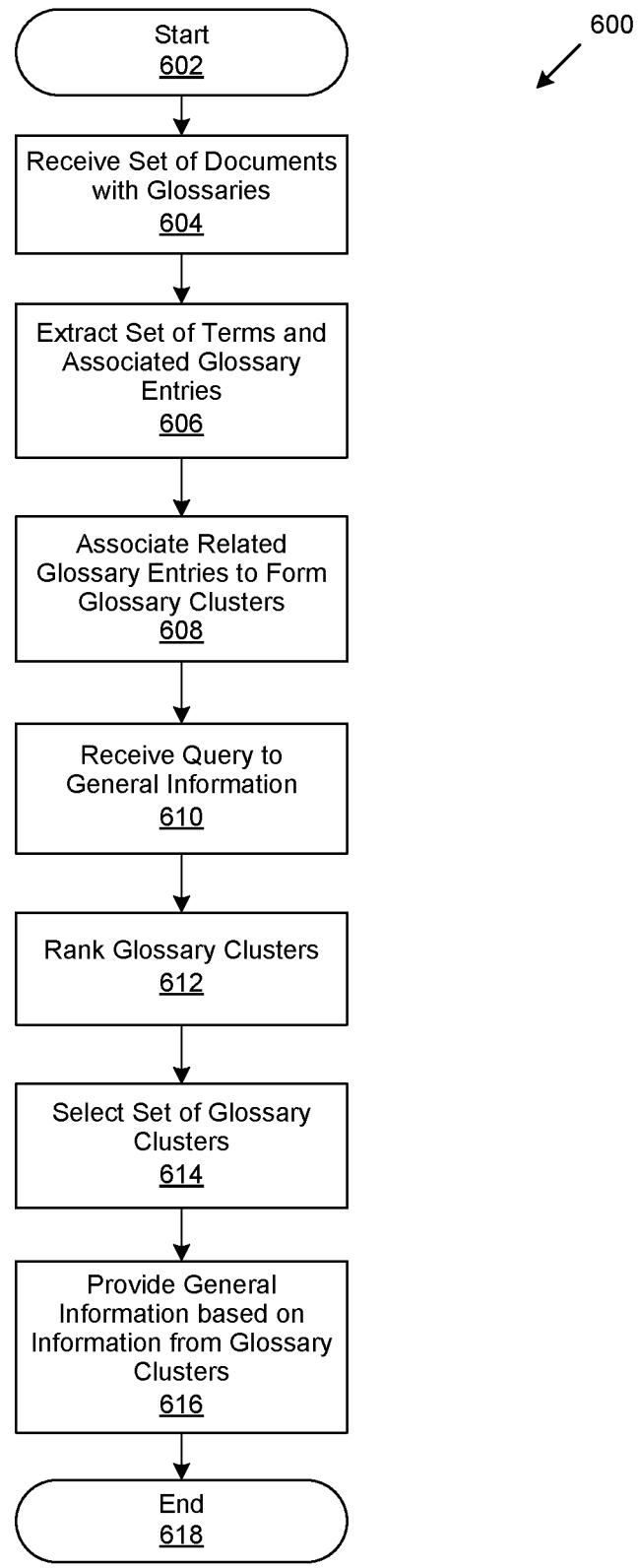
FIG. 6 is a generalized flow chart for answering general background questions on a topic from documents with glossary sections.

FIG. 6 is a generalized flowchart 600 for answering general background questions on a topic from documents with glossary sections. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, a set of documents with glossary sections is received. At step 606, a set of terms and their associated glossary entries are extracted from the glossary sections, the set of terms can be defined as "T" of the set $(T_1, T_2, \ldots, T_n)$ or $T(T_1, T_2, \ldots, T_n)$ and associated glossary entries "G" of the set $(G_1, G_2, \ldots, G_n)$ or $G(G_1, G_2, \ldots, G_n)$, where each term $T_i$ has an associated glossary entry $G_i$.

At step 608, related glossary entries are associated together based on a similarity algorithm, such as a clustering algorithm, to form glossary clusters "C" of the of the set $(C_1, C_2, \ldots, C_n)$ or $C(C_1, C_2, \ldots, C_n)$. Each $C_i$ entry can refer to one or more glossary entry $G_i$. In certain implementations, the clustering al converts the glossary entries into a vector representation and clusters based on pairwise cosine distances. In certain implementations, the clustering algorithm generates a dendrogram, and identifies a threshold to split the dendrogram into clusters.

At step 610, a query is received, where the query is tailored to general information and includes query terms. At step 612, ranking is performed on the glossary clusters, where the ranking is based on relevance to the query terms to form a ranked set. At step 614, selecting a set of glossary clusters is performed based on high ranked threshold. At step 616, general information is provided based on the information from the glossary clusters that meet the high ranked threshold. At step 618, the process 600 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for answering general background questions on a topic from documents with glossary sections comprising:
    receiving a set of documents with glossaries;
    extracting a set of terms $T(T_1, T_2, \ldots, T_n)$ and associated glossary entries $G(G_1, G_2, \ldots, G_n)$ wherein each term $T_i$ has a corresponding glossary entry $G_i$;
    associating related glossary entries together based on a similarity algorithm to form glossary clusters $C(C_1, C_2, \ldots, C_n)$, wherein each glossary cluster $C_i$ refers to one or more glossary entry $G_i$;
    receiving a query tailored to general information with query terms;
    ranking the glossary clusters $C(C_1, C_2, \ldots, C_n)$ based on a relevance to the query terms to form a ranked set
    selecting a set of glossary clusters meeting a high ranked threshold; and
    providing the general information based on extracting information from the glossary clusters that meet the high ranked threshold.

2. The method of claim 1, wherein the glossary clusters $C(C_1, C_2, \ldots, C_n)$ are formed by a clustering algorithm.

3. The method of claim 2, wherein the clustering algorithm converts the glossary entries into a vector representation and clusters based on pairwise cosine distance.

4. The method of claim 2, wherein the clustering algorithm generates a dendrogram, and identifies a threshold to split the dendrogram into clusters.

5. The method of claim 1, wherein the documents with glossaries are received from different sources.

6. The method of claim 1, wherein the glossary clusters $C(C_1, C_2, \ldots, C_n)$ are topic clusters and are indexed.

7. The method of claim 6, wherein the indexed topic clusters are used in retrieval of the general information.

8. A system comprising:
    a processor;
    a data bus coupled to the processor; and
    a non-transitory computer-usable medium embodying computer program code, the computer-usable medium being coupled to the data bus, the computer program code used for answering general background questions on a topic from documents with glossary sections executable by the processor and configured for:
    receiving a set of documents with glossaries;
    extracting a set of terms $T(T_1, T_2, \ldots, T_n)$ and associated glossary entries $G(G_1, G_2, \ldots, G_n)$ wherein each term $T_i$ has a corresponding glossary entry $G_i$;
    associating related glossary entries together based on a similarity algorithm to form glossary clusters $C(C_1, C_2, \ldots, C_n)$ wherein each glossary cluster $C_i$ refers to one or more glossary entry $G_i$;
    receiving a query tailored to general information with query terms;
    ranking the glossary clusters $C(C_1, C_2, \ldots, C_n)$ based on a relevance to the query terms to form a ranked set;
    selecting a set of glossary clusters meeting a high ranked threshold; and
    providing the general information based on extracting information from the glossary clusters that meet the high ranked threshold.

9. The system of claim 8, wherein the glossary clusters $C(C_1, C_2, \ldots, C_n)$ are formed by a clustering algorithm.

10. The system of claim 9, wherein the clustering algorithm converts the glossary entries into a vector representation and clusters based on pairwise cosine distance.

11. The system of claim 9, wherein the clustering algorithm generates a dendrogram, and identifies a threshold to split the dendrogram into clusters.

12. The system of claim 8, wherein the documents with glossaries are received from different sources.

13. The system of claim 8, wherein the glossary clusters $C(C_1, C_2, \ldots, C_n)$ are topic clusters and are indexed.

14. A non-transitory, computer-readable storage medium embodying computer program code, the computer program code comprising computer executable instructions configured for:

receiving a set of documents with glossaries;

extracting a set of terms $T(T_1, T_2, \ldots, T_n)$ and associated glossary entries $G(G_1, G_2, \ldots, G_n)$ wherein each term $T_i$ has a corresponding glossary entry $G_i$;

associating related glossary entries together based on a similarity algorithm to form glossary clusters $C(C_1, C_2, \ldots, C_n)$ wherein each glossary cluster $C_i$ refers to one or more glossary entry $G_i$;

receiving a query tailored to general information with query terms;

ranking the glossary clusters $C(C_1, C_2, \ldots, C_n)$ based on a relevance to the query terms to form a ranked set selecting a set of glossary clusters meeting a high ranked threshold; and providing the general information based on extracting information from the glossary clusters that meet the high ranked threshold.

15. The non-transitory, computer-readable storage medium of claim 14, wherein the glossary clusters $C(C_1, C_2, \ldots, C_n)$ are formed by a clustering algorithm.

16. The non-transitory, computer-readable storage medium of claim 15, wherein the clustering algorithm converts the glossary entries into a vector representation and clusters based on pairwise cosine distance.

17. The non-transitory, computer-readable storage medium of claim 15, wherein the clustering algorithm generates a dendrogram, and identifies a threshold to split the dendrogram into clusters.

18. The non-transitory, computer-readable storage medium of claim 14, wherein the documents with glossaries are received from different sources.

19. The non-transitory, computer-readable storage medium of claim 14, wherein the glossary clusters $C(C_1, C_2, \ldots, C_n)$ are topic clusters and are indexed.

20. The non-transitory, computer-readable storage medium of claim 14, wherein the indexed topic clusters are used in retrieval of the general information.

* * * * *